(12) United States Patent
Shah et al.

(10) Patent No.: US 7,168,072 B2
(45) Date of Patent: Jan. 23, 2007

(54) WIZARD FOR PROGRAMMATICALLY ANALYZING AND MODIFYING TIME-CRITICAL GRAPHICAL PROGRAMS

(75) Inventors: Darshan K. Shah, Round Rock, TX (US); Bob Preis, Austin, TX (US)

(73) Assignee: National Instruments Corporation, Austin, TX (US)

( * ) Notice: Subject to any disclaimer, the term of this patent is extended or adjusted under 35 U.S.C. 154(b) by 780 days.

(21) Appl. No.: 10/198,213

(22) Filed: Jul. 18, 2002

(65) Prior Publication Data

US 2004/0015924 A1    Jan. 22, 2004

(51) Int. Cl.
G06F 9/45 (2006.01)
(52) U.S. Cl. .................................. 717/154; 717/105
(58) Field of Classification Search ........ 717/168–178, 717/105, 154; 715/513–975; 709/217
See application file for complete search history.

(56) References Cited

U.S. PATENT DOCUMENTS

| | | | |
|---|---|---|---|
| 4,831,580 A | 5/1989 | Yamada | |
| 5,210,837 A | 5/1993 | Wiecek | |
| 5,428,776 A * | 6/1995 | Rothfield | 707/4 |
| 5,481,741 A | 1/1996 | McKaskle et al. | |
| 5,966,532 A | 10/1999 | McDonald et al. | |
| 6,437,805 B1 | 8/2002 | Sojoodi et al. | |
| 6,453,464 B1 | 9/2002 | Sullivan et al. | |
| 6,539,027 B1 * | 3/2003 | Cambron | 370/442 |
| 6,817,007 B2 * | 11/2004 | Burnette et al. | 716/18 |
| 6,868,526 B2 * | 3/2005 | Singh | 715/763 |
| 2001/0020291 A1 | 9/2001 | Kudukoli et al. | |
| 2001/0024211 A1 | 9/2001 | Kudukoli et al. | |
| 2001/0034879 A1 | 10/2001 | Washington et al. | |
| 2001/0035879 A1 | 11/2001 | Washington et al. | |
| 2002/0083413 A1 | 6/2002 | Kodosky et al. | |
| 2002/0089538 A1 | 7/2002 | Wenzel et al. | |
| 2002/0129333 A1 | 9/2002 | Chandhoke et al. | |
| 2003/0020765 A1 * | 1/2003 | Kussmaul et al. | 345/853 |

(Continued)

FOREIGN PATENT DOCUMENTS

EP    1077404    2/2001

*Primary Examiner*—Wei Zhen
*Assistant Examiner*—Mulubrhan Tecklu
(74) *Attorney, Agent, or Firm*—Meyertons Hood Kivlin Kowert & Goetzel, P.C.; Jeffrey C. Hood; Jason L Burgess

(57) ABSTRACT

A system and method for automatically improving performance of a first graphical program that performs one or more repetitive operations, e.g., in a loop. The first graphical program may be programmatically analyzed and may be programmatically modified based on the analysis. Programmatically modifying the first graphical program may include programmatically modifying the one or more repetitive operations or the loop performed by the first graphical program, where the modification results in improved performance. In one embodiment, the performance of the first graphical program may be improved by increasing deterministic behavior. For example, deterministic behavior may be especially important for a real-time or time critical application. In one embodiment, determinism may be increased by removing functionality from the first graphical program which causes time latency problems. In one embodiment, one or more additional graphical programs may be programmatically generated to perform the functionality previously performed by the first graphical program, where the one or more additional graphical programs execute simultaneously with the first graphical program.

68 Claims, 13 Drawing Sheets

U.S. PATENT DOCUMENTS

2004/0034696 A1 2/2004 Joffrain et al.
2004/0034847 A1 2/2004 Joffrain et al.
2005/0028138 A1 2/2005 Case et al.
2005/0091602 A1 4/2005 Ramamoorthy et al.

* cited by examiner

WIZARD FOR PROGRAMMATICALLY ANALYZING AND MODIFYING TIME-CRITICAL GRAPHICAL PROGRAMS

FIELD OF THE INVENTION

The present invention relates to the fields of computer software and graphical programming. More particularly, the invention relates to a system and method for programmatically analyzing and modifying a graphical program which performs a real-time or time-critical process.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The graphical user interface may include various graphical user interface elements or front panel objects, such as user interface controls and/or indicators that represent or display the respective input and output used or produced by the graphical program or VI, and may include other icons which represent devices being controlled. The graphical user interface may be comprised in a single window of user interface elements, or may comprise a plurality of individual windows each having one or more user interface elements, wherein the individual windows may optionally be tiled together. When the user interface controls and indicators are created, corresponding icons or terminals may be automatically created in the block diagram. Alternatively, the user can place terminal icons in the block diagram which may cause the display of corresponding user interface elements in the graphical user interface, either at edit time or later at run time. As another example, the graphical user interface panel may comprise user interface elements or front panel objects, e.g., the GUI, embedded in the block diagram. Further, the user interface may be characterized as a "front panel" where the user may interactively control or manipulate the input being provided to the graphical program and view the resulting output during program execution.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

Graphical programs are also used in applications in which real-time performance or deterministic behavior is required for proper operation. Many computer operating systems cannot guarantee real-time or deterministic performance. For example, various overhead issues, such as context switches, driver calls, disk caching, user I/O and interrupts may limit the operating system's ability to guarantee real-time performance. Therefore, specialized execution environments for real-time graphical programs have been developed.

However, in some cases the performance of the graphical program may still be limited due to the programmer using non-optimal programming techniques to implement the desired program behavior. It would be desirable to provide a system and method to automatically analyze a graphical program to determine factors which limit the program's performance and to automatically modify the graphical program to improve its performance.

SUMMARY

One embodiment of the present invention comprises a system and method for improving performance of a graphical program, referred to as a "first" graphical program. The system and method may be used to improve performance of a first graphical program that performs one or more repetitive operations. For example, in one embodiment, the graphical program may execute a loop in which the one or more operations are performed multiple times. In another embodiment, the one or more operations may be performed in response to an event, trigger, or other condition. For example, the event, trigger, or other condition may occur multiple times during execution of the graphical program, and the one or more operations may be performed in response to each occurrence.

The first graphical program may be created by a user and may be stored in a memory of a computer system. The computer system may execute a program operable to programmatically analyze the first graphical program. Programmatically analyzing the first graphical program may include programmatically analyzing the one or more repetitive operations performed by the first graphical program and/or programmatically analyzing a loop in which the one or more repetitive operations are performed. For example, programmatically analyzing the first graphical program may include analyzing data structures representing the first graphical program in the memory, e.g., to determine graphical program elements present in the first graphical program.

The first graphical program may be programmatically, i.e., automatically, modified based on the analysis. The graphical program may be programmatically modified with little or no user input received during the modification process. Programmatically modifying the first graphical program may include programmatically modifying or replacing the one or more repetitive operations performed by the first graphical program, where the modification results in improved performance of the first graphical program. Where the one or more repetitive operations are performed in a loop, programmatically modifying the first graphical program may include programmatically modifying the loop performed by the first graphical program (or programmatically modifying or replacing operations performed within the loop), where the modification results in improved performance of the loop.

In various embodiments, the performance of the first graphical program may be improved in any of various ways. In one embodiment, the performance of the first graphical program may be improved by increasing deterministic behavior of the first graphical program. For example, deterministic behavior may be especially important for a real-time or time critical application.

In one embodiment, the first graphical program may include functionality that causes time latency problems. For example, user interface functionality may cause time latency problems in the first graphical program. The determinism of the first graphical program may be increased by removing the functionality that causes time latency problems or by modifying the graphical program to implement the functionality in a different way such that the time latency problems are eliminated or reduced. In one embodiment, one or more additional graphical programs may be programmatically generated to perform the functionality previously performed by the first graphical program or to communicate with the first graphical program to perform this functionality. The one or more additional graphical programs may execute simultaneously with the first graphical program.

BRIEF DESCRIPTION OF THE DRAWINGS

A better understanding of the present invention can be obtained when the following detailed description of the preferred embodiment is considered in conjunction with the following drawings, in which.

Figure 1A:
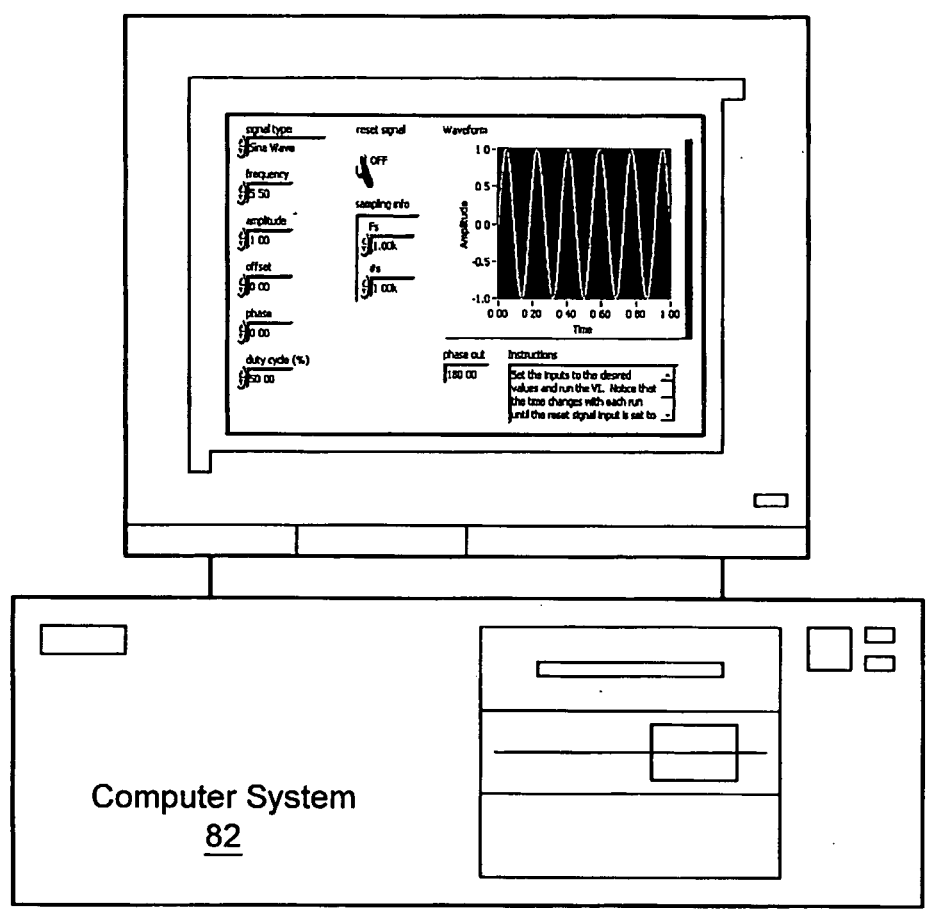
FIG. 1A illustrates a computer system operable to programmatically analyze a graphical program and programmatically modify the graphical program based on the analysis.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 6,370,569 titled "Data Socket System and Method for Accessing Data Sources Using URLs," filed Nov. 3, 1998.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. patent application Ser. No. 09/737,527 titled "System and Method for Configuring a GUI Element to Publish or Subscribe to Data," filed Dec. 13, 2000.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1A illustrates a computer system 82 operable to programmatically analyze a graphical program and programmatically modify the graphical program based on the analysis. As described below, the computer system 82 may programmatically, i.e., automatically, analyze and modify the graphical program to improve execution performance of the graphical program. As used herein, the term "programmatically" is intended to mean that the associated operation is performed by a program (as opposed to being performed manually by a user), such as a program executing in a computer or a program executing in a programmable hardware device such as an FPGA.

In one embodiment, the computer system 82 may be operable to display a series of user interface panels or screens to guide the user through the process of modifying the graphical program or to receive user input specifying options for affecting the modifications made to the graphical program. This series of screens may be referred to as a "wizard".

In the present application, the term "graphical program" or "block diagram" is intended to include a program comprising graphical source code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program. A data flow graphical program or data flow diagram refers to a graphical program or block diagram wherein the interconnections between nodes or blocks indicate that data produced by one block is used by another block.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output used or produced by the graphical program or VI, and may include other icons which represent devices being controlled. The user interface may be comprised in a single window of user interface elements, or may comprise a plurality of individual windows each having one or more user interface elements, wherein the individual windows may optionally be tiled together. As another example, the user interface may comprise user interface or front panel objects, e.g., the GUI, embedded in the block diagram. The user interface of a graphical program may display only output, only input, or both input and output. Further, the user interface may be characterized as a "front panel" where the user may interactively control or manipulate the input being provided to the graphical program and view the resulting output during program execution.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

Referring again to FIG. 1A, the computer system 82 may be any type of computer system, including a personal computer system, mainframe computer system, workstation, network appliance, Internet appliance, personal digital assistant (PDA), television system, or other device. In general, the term "computer system" can be broadly defined to encompass any device having at least one processor that executes instructions from a memory medium.

The computer system 82 may include a memory medium(s) on which one or more computer programs or software components according to one embodiment of the present invention may be stored. For example, the memory medium may store one or more graphical programs which are to be analyzed/modified according to the methods described herein. Also, the memory medium may store a program operable to programmatically analyze and modify the graphical program(s). The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Various embodiments further include receiving or storing instructions and/or data implemented in accordance with the present description upon a carrier medium. Suitable carrier media include a memory medium as described above, as well as signals such as electrical, electromagnetic, or digital signals, conveyed via a communication medium such as networks and/or a wireless link.

Figure 1B:
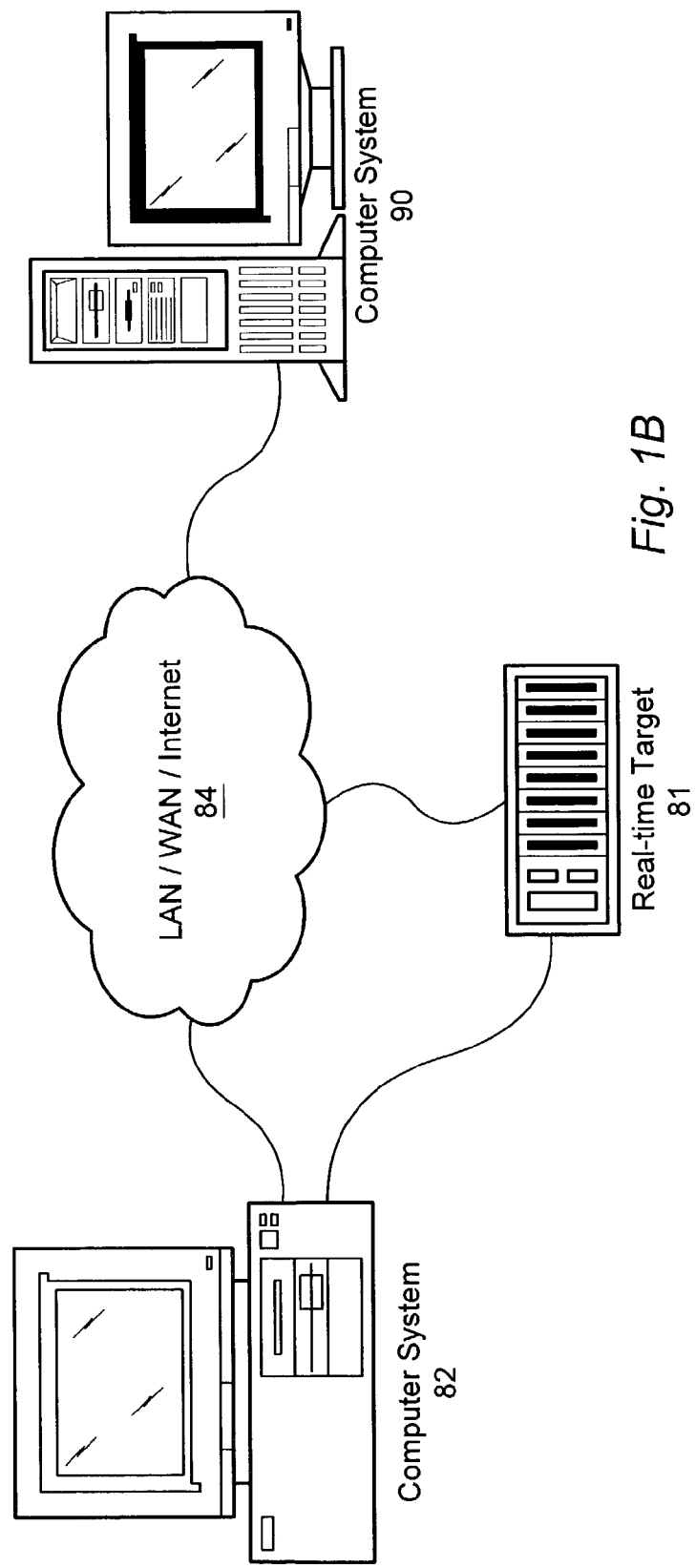
FIG. 1B illustrates an exemplary system in which a time-critical graphical program may execute.

FIG. 1B—System Environment

In various embodiments, a graphical program which is programmatically analyzed and modified to improve execution performance of the program may be a graphical program designed for any of various types of applications. In one embodiment, the graphical program may be a graphical program for performing a real-time or time-critical application. For example, the graphical program may be intended to execute in an embedded system in which real-time performance or deterministic behavior is required. Such a graphical program is referred to herein as a time-critical graphical program.

A time-critical graphical program may be executed within the context of a system including any of various kinds of devices. FIG. 1B illustrates one exemplary system in which a time-critical graphical program may execute. As shown, the system includes a real-time target device 81. The real-time target device 81 may execute the time-critical graphical program, e.g., in a real-time or deterministic manner. For example, in one embodiment, the real-time target device 81 may include a CPU and memory, also referred to as an embedded CPU and embedded memory. The embedded memory may store a real-time operating system kernel which provides basic operating system services. In one embodiment, the real-time target device 81 may also include a graphical program execution engine which enables the real-time target device 81 to execute the time-critical graphical program. Alternatively, the graphical program may be compiled into machine language, thereby possibly obviating the need for a graphical program execution engine. For example, the graphical program may first be converted to a text-based program, such as a C program, and the text-based program may be compiled into machine language.

As shown in FIG. 1B, in one embodiment, the real-time target device 81 may be coupled to the computer system 82. For example, after the computer system 82 has programmatically analyzed and modified the time-critical graphical program, the computer system 82 may be operable to download or deploy the time-critical graphical program on the real-time target device 82 for execution.

In another embodiment, the real-time target device 81 may be connected to a computer system other than the computer system 82. For example, the computer system 82 may be used to programmatically analyze/modify the time-critical graphical program, and the time-critical graphical program may then be deployed within a production system that does not include the computer system 82.

In various embodiments, the real-time target device 81 may comprise a device of any kind, may take on any of various form factors, and may be coupled to the computer system 82 (or another computer system) in any way. In one embodiment, the real-time target device 81 may comprise an interface card or device coupled to (or plugged in to) the host computer system 82 (or another computer system). In this embodiment, the embedded memory of the real-time target device 81 (or the memory of the host computer system 82) may further include a shared memory portion used for bi-directional communication between the host computer system 82 and the real-time target device 81. In an alternate embodiment, the real-time target device 81 may comprise an external instrument or device coupled to the computer system 82, such as through a cable, wired network connection, wireless network connection, etc. Various examples of the real-time target device 81 are given below with reference to FIGS. 2A and 2B. Also, in one embodiment, a time-critical graphical program may execute on a general purpose computer system, such as a PC. For example, the PC may execute a specialized real-time operating system, or the time-critical graphical program may be executed using the highest operating system priority.

In one embodiment, a portion of the time-critical graphical program may execute on the real-time target device 81, and another portion may execute on the computer system 82 (or other computer system). For example, in one embodiment, programmatically modifying the time-critical graphical program to improve its performance may comprise modifying the time-critical graphical program so that at least a portion of the program executes on the computer system 82. In other words, initially the time-critical graphical program may be configured to execute entirely on the real-time target device 81. The time-critical graphical program may be programmatically modified such that a portion of the time-critical graphical program is changed to execute on the computer system 82.

In another embodiment, programmatically modifying the time-critical graphical program to improve its performance may comprise not only modifying the time-critical graphical program, but also programmatically generating a second graphical program to execute in parallel with the time-critical graphical program. For example, the programmatically generated second graphical program may be operable to perform a portion of the functionality previously performed by the unmodified time-critical graphical program. In other words, the time-critical graphical program may be modified to remove a portion that implements first functionality, and a second graphical program may be generated that implements the first functionality removed from the time-critical graphical program. The second graphical program may communicate with the time-critical graphical program to perform the first functionality. In one embodiment, the second graphical program may execute on the real-time target device 81 in parallel with the time-critical graphical program. For example, the time-critical graphical program may be executed at the highest operating system priority to maximize deterministic behavior, while the second graphical program may be executed at a lower or normal priority.

In another embodiment, the second graphical program may execute on the computer system 82. In this instance, the second graphical program may communicate with the time-critical graphical program using various techniques, such as through a shared memory portion allowing communication between the computer system 82 and the real-time target device 81, or through messages sent over a network connecting the computer system 82 and the real-time target device 81.

In many instances, it is desirable to provide a graphical user interface or front panel for a time-critical graphical program. For example, the time-critical graphical program may utilize program input, may produce program output, or both. Thus, the graphical user interface may include one or more user interface elements for displaying program output or receiving program input. As used herein, a user interface element for displaying program output is referred to as a user interface indicator, and a user interface element for receiving program input from the user is referred to as a user interface control. In some instances, a single user interface element may act as both a control and indicator. Examples of user interface controls and indicators include buttons, check boxes, text boxes, lists, graphs, charts, menu bars, toolbars, etc., among others.

Thus, an unmodified time-critical graphical program, e.g., a graphical program created by a user, may include graphical source code to implement user interface functionality to display data in user interface indicators and/or receive data from user interface controls. However, if the time-critical graphical program was not implemented carefully, the user interface functionality may decrease the performance of the graphical program. For example, to perform a user interface function, it may be necessary to swap to a lower-priority thread which handles the user interface and then swap back. This swapping may introduce timing problems into what should be the most important program executing with no interruptions. These problems are especially apparent when the user interface functionality is performed repeatedly, e.g., performed in a loop or performed in response to events, triggers, or other conditions that occur repeatedly. Even a small amount of latency or jitter introduced into a time-critical loop can lead to poor, non-deterministic loop rates.

Thus, in one embodiment, programmatically modifying the time-critical graphical program to improve its performance may comprise removing user interface functionality from the time-critical graphical program. The time-critical graphical program may be programmatically modified to instead exchange data with a second graphical program. As noted above, the second graphical program may be a programmatically generated graphical program intended to execute at a normal priority. The second graphical program may then perform the user interface functionality previously performed by the time-critical graphical program. For example, where the unmodified time-critical graphical program previously generated data and displayed the data in a user interface indicator, the programmatically modified time-critical graphical program may instead pass the data to the second graphical program, and the second graphical program may display the data in the user interface indicator. Similarly, where the unmodified time-critical graphical program previously received data from a user interface control, the programmatically modified time-critical graphical program may instead receive the data from the second graphical program, which receives the data from the user interface control. Thus, the user's original graphical program may be automatically modified, and a second graphical program may be automatically generated, such that the performance of the real-time or time-critical application is increased.

In one embodiment, the computer system 82 may be utilized to display the graphical user interface or front panel. For example, as noted above, in one embodiment, the second graphical program may execute on the real-time target device 81 along with the time-critical graphical program. In one embodiment, program output from the second graphical program's block diagram may be displayed in the graphical user interface on a display device of the computer system 82. Similarly, in response to receiving user input to the graphical user interface displayed on computer system 82, the user input may be provided to the block diagram of the second graphical program executing on the real-time target device 81. The above-incorporated patent application titled "Graphical Programming System with Distributed Block Diagram Execution and Front Panel Display" describes one embodiment of a method enabling graphical program execution and GUI display to be distributed across multiple computer systems.

In another embodiment, a third graphical program may also be programmatically generated in addition to the second graphical program. The second graphical program may execute on the real-time target device 81 along with the modified time-critical graphical program, and the third graphical program may execute on the computer system 82. The third graphical program may be responsible for the user interface functionality of displaying output of the time-critical graphical program on the graphical user interface displayed on the computer system 82, and/or receiving input for the time-critical graphical program via the graphical user interface displayed on the computer system 82. In this embodiment, the second graphical program may act as an intermediate program between the time-critical graphical program and the third graphical program. For example, the second graphical program may receive data generated by the time-critical graphical program and may send the data to the third graphical program. The third graphical program may then display the data in a user interface indicator. Similarly, the third graphical program may receive data via a user interface indicator and may send the data to the second graphical program. The time-critical graphical program may then receive this data from the second graphical program. Thus, the second graphical program is also referred to herein as the data exchange graphical program, and the third graphical program is also referred to herein as the UI graphical program.

As shown in FIG. 1B, in one embodiment, the real-time target device 81 may be coupled to a computer system 90 via a network 84. The network 84 may be any of various types, including a LAN (local area network), WAN (wide area network), the Internet, or an Intranet, among others. In one embodiment, the computer system 90 may be utilized to display the graphical user interface or front panel for the time-critical graphical program. For example, the third graphical program, i.e., the programmatically generated UI graphical program described above, may be deployed and executed on the computer system 90. The second graphical program, i.e., the data exchange graphical program, may communicate with the third graphical program via the network 84. As described below, in one embodiment, when the time-critical graphical program is programmatically modified and the data exchange and UI graphical programs are programmatically generated, the user may be able to specify a desired communication technique to use for the communication, such as TCP/IP, UDP, DataSocket, etc.

In another embodiment, the real-time target device 81 may not be connected to the network 84 or may not have network capabilities. In this case, information may be channeled through the computer system 82 to display the graphical user interface on the computer system 90, where the computer system 82 is coupled to the computer system 90 via the network 84. For example, the data exchange graphical program may be executed on the computer system 82, and the UI graphical program may be executed on the computer system 90.

Thus, in one embodiment, the user's original time-critical graphical program may be automatically modified to not only improve its performance, but may also be automatically modified to distribute the display and execution across multiple computer systems. This may be desirable, for example, if the user originally developed and tested the graphical program using a computer system including a display device, but then desires to deploy the graphical program on a real-time target device 81 that does not include a display. This may also be desirable to enable the graphical program to be controlled or viewed remotely via a network. For example, the time-critical graphical program may be deployed in a remote field location, but may be controlled or monitored by technicians from a laboratory.

Figure 2A:
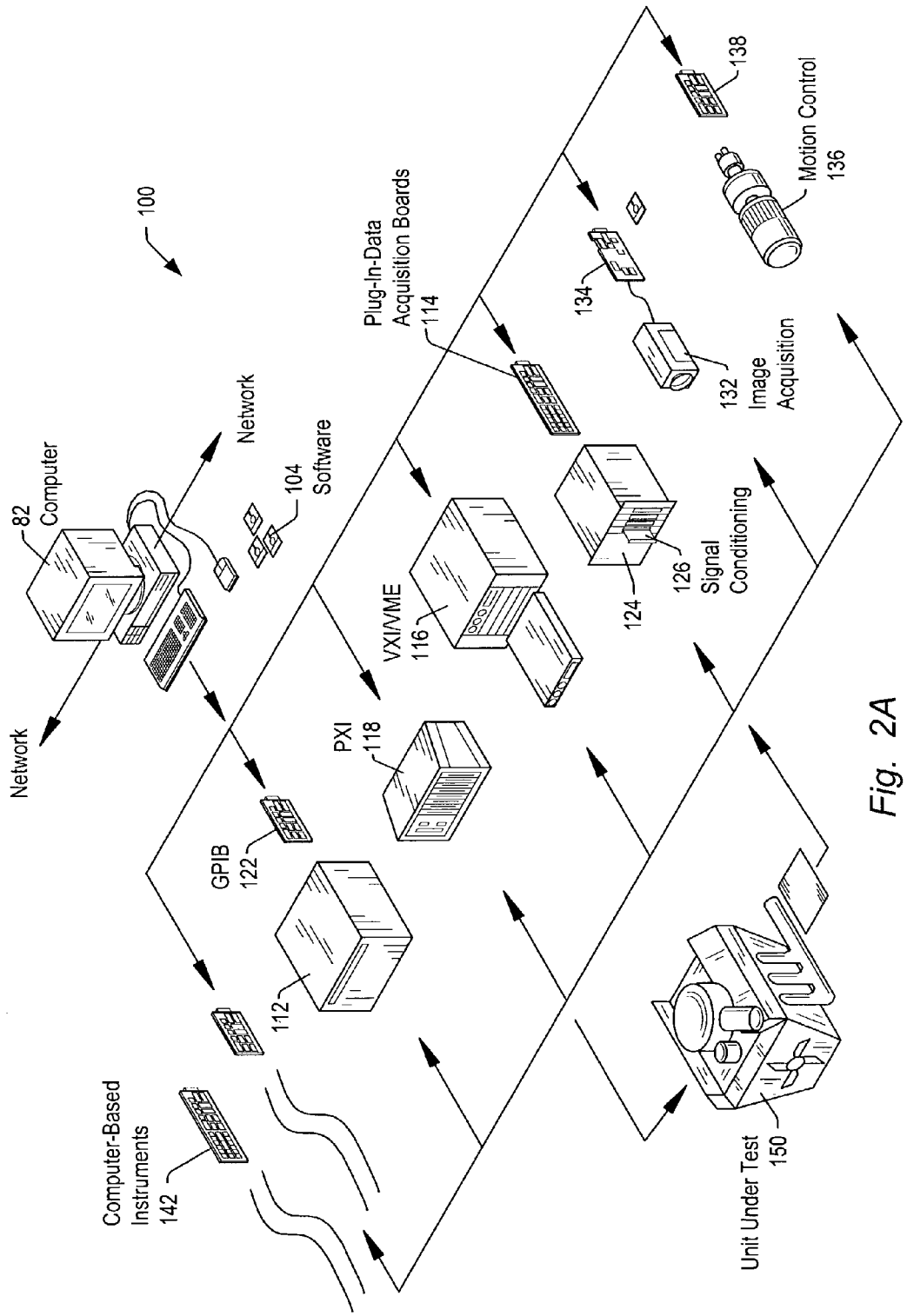
FIG. 2A illustrates an exemplary instrumentation control system.
Figure 2B:
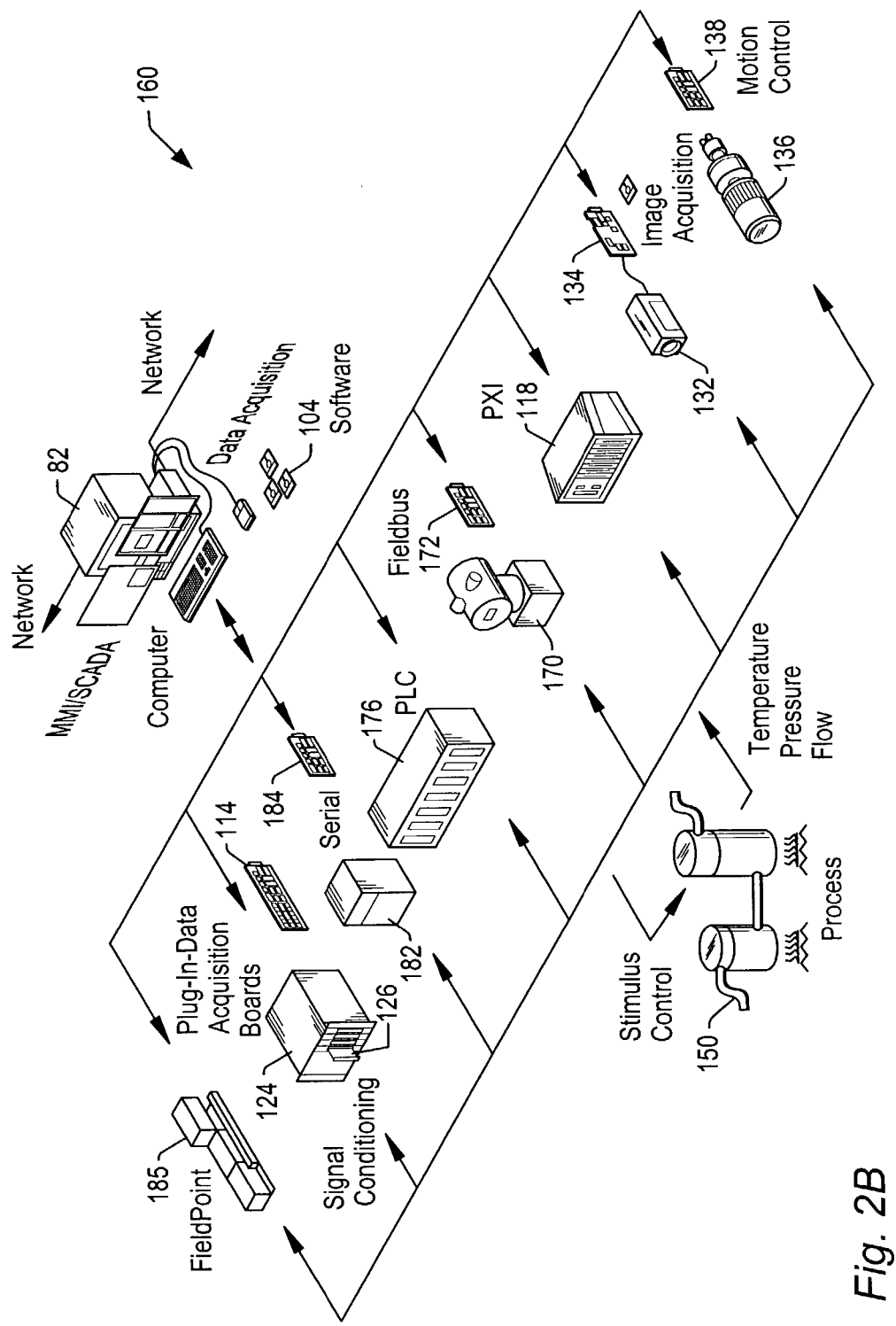
FIG. 2B illustrates an exemplary industrial automation system.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and are not limited to instrumentation or industrial automation applications. In other words, the following description is exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot-provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

In various embodiments, the real-time target device discussed above with reference to FIG. 1B may comprise one or more of the devices shown connected to the computer 82 in FIG. 2A. For example, one or more of the devices may include an embedded CPU and memory and may execute a real time kernel and a graphical program execution engine to enable execution of graphical programs in a real-time or deterministic manner. For example, one or more of the GPIB card 122, the DAQ card 114, or the VXI card may comprise an embedded system. Alternatively, or in addition, one or more of the GPIB instrument 112, the VXI instrument 116, or the serial instrument may comprise an embedded system.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

In various embodiments, the real-time target device discussed above with reference to FIG. 1B may comprise one or more of the devices shown connected to the computer 82 in FIG. 2B. For example, one or more of the devices may include an embedded CPU and memory and may execute a real time kernel and a graphical program execution engine to enable execution of graphical programs in a real-time or deterministic manner. For example, one or more of the data acquisition board 114, the serial instrument 182, the serial interface card 184, the PLC 176, or the fieldbus interface card 172 may comprise an embedded system.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. In one embodiment, a time-critical graphical program may implement a measurement function. For example, the time-critical graphical program may be used to acquire measurement data using a hardware input function. Graphical programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
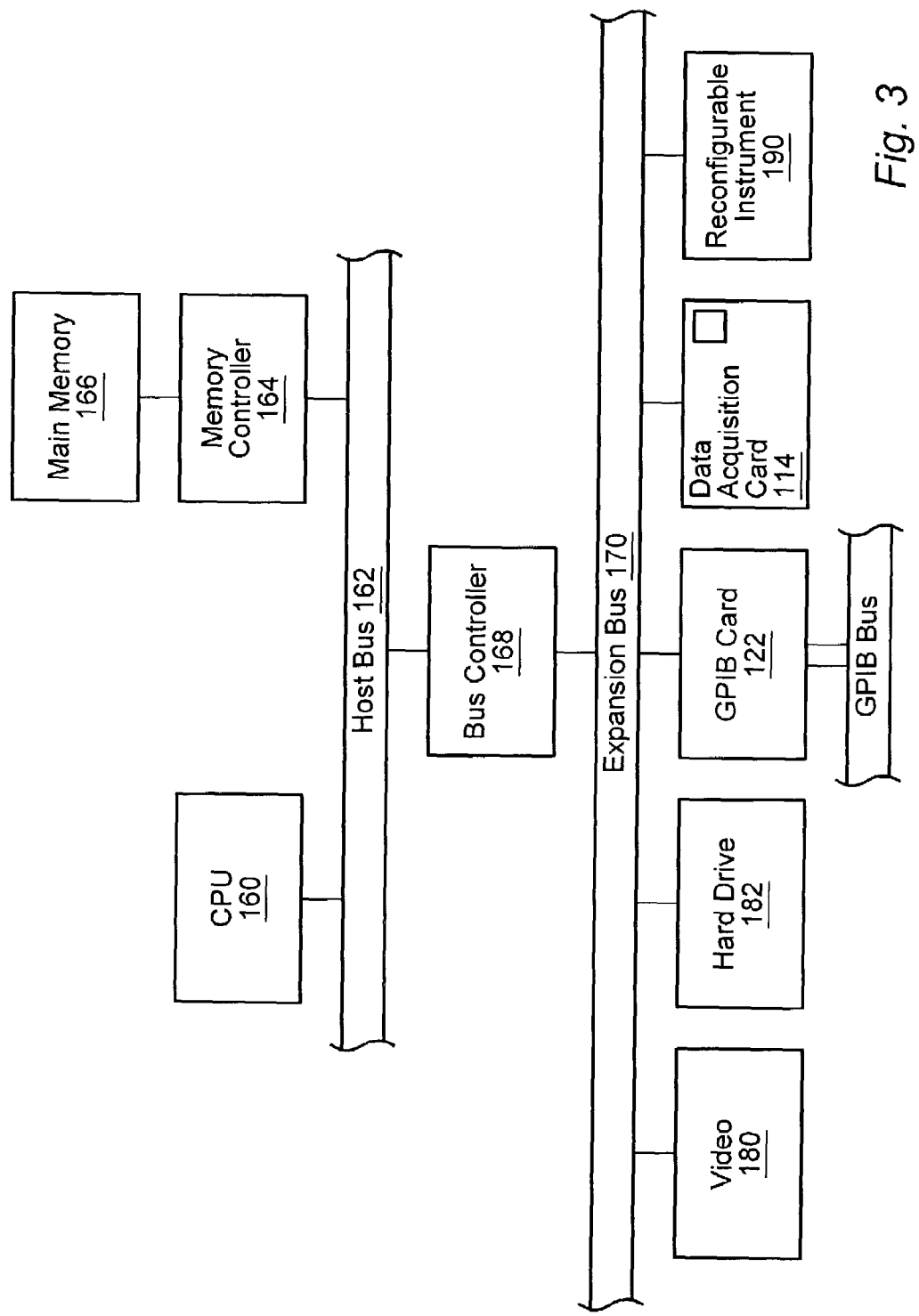
FIG. 3 is an exemplary block diagram of a computer system shown in FIGS. 1, 1B, 2A and/or 2B.

FIG. 3—Computer System Block Diagram

FIG. 3 is a block diagram representing one embodiment of the computer system 82 and/or 90 illustrated in FIGS. 1A, 1B, 2A and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store a graphical program, as well as software operable to programmatically analyze and modify a graphical program, as described above with reference to FIG. 1A. The main memory may also store operating system software, as well as other software for operation of the computer system.

In another embodiment, the main memory 166 may store a graphical program that has been programmatically modified and/or a graphical program that has been programmatically generated according to the methods described herein. For example, the main memory 166 may store a programmatically generated data exchange graphical program or UI graphical program such as described above with reference to FIG. 1B. For example, the main memory 166 may store the graphical program so that the graphical program can be executed by the CPU 160. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

In one embodiment, one or more of the interface cards or devices coupled to the expansion bus, such as the DAQ card 114, the GPIB interface card 122, the GPIB instrument 112, or a VXI or MXI bus card 186 may comprise an embedded system including an embedded CPU and embedded memory, e.g., the real-time target device 81 discussed above with reference to FIG. 1B. In an alternate embodiment, the real-time target device 81 may be a stand-alone device, and may be coupled as a node to a network. In this embodiment, the host computer 82 may also be connected as a node on the network. As noted above, the real-time target device 81 may also take on any of various other configurations, as desired.

Figure 4:
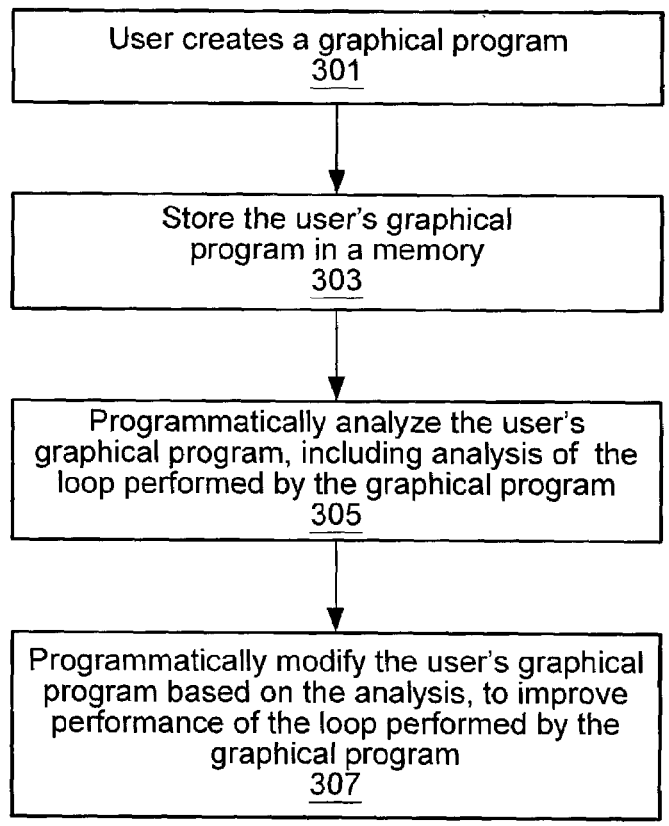
FIG. 4 is a flowchart diagram illustrating one embodiment of a method for automatically improving performance of a graphical program that includes a loop.

FIG. 4—Method for Automatically Improving Performance of a Graphical Program

In various embodiments, the present invention may comprise automatically improving performance of a graphical program in any of various ways. Many graphical programs perform loops, i.e., a portion of graphical source code which is executed multiple times, such as a While loop or For loop. One way to substantially increase the performance of such a graphical program is to increase performance of the loop, since this graphical source code is executed in multiple iterations.

FIG. 4 is a flowchart diagram illustrating one embodiment of a method for automatically improving performance of a graphical program that includes a loop. It is noted that FIG. 4 illustrates a representative embodiment, and alternative embodiments are contemplated.

In 301, a user may create the graphical program. In various embodiments, the graphical program may be created using any graphical programming development environment. Examples of graphical programming development environments for creating graphical programs include LabVIEW, DasyLab, and DiaDem from National Instruments; VEE from Agilent; WiT from Coreco; Vision Program Manager from PPT Vision; SoftWIRE from Measurement Computing; Simulink from the MathWorks; Sanscript from Northwoods Software; Khoros from Khoral Research; SnapMaster from HEM Data; and VisSim from Visual Solutions, among others.

Creating the graphical program may include creating a block diagram for the graphical program. The block diagram may be created in response to direct user input, e.g., the user may create the block diagram by placing or "dragging and dropping" icons or nodes on the display and interconnecting the nodes in a desired fashion. The plurality of nodes in the block diagram may be interconnected in response to user input to visually indicate functionality of the graphical program. The block diagram may have one or more of data flow, control flow, and/or execution flow representations.

The user may include graphical source code in the graphical program to enable the graphical program to perform a loop. For example, the graphical programming development environment may provide one or more nodes or programming constructs for performing loops, which the user may include in the graphical program. The user may also associate graphical source code with the loop, i.e., the graphical source code which is executed multiple times as the loop is performed.

Creating the graphical program may also include creating a graphical user interface or front panel, e.g., in response to user input. The graphical user interface may be created in any of various ways, e.g., depending on the graphical programming development environment used. Creating the graphical user interface or front panel may comprise specifying various user interface elements. These user interface elements may include elements such as one or more windows or panels, menu bars, context menus, etc., as well as various user interface controls and indicators for receiving program input and/or displaying program output. Examples of user interface controls and indicators include charts, graphs, push buttons, knobs, numeric controls, text boxes, list boxes, check boxes, etc.

In one embodiment, the user may include graphical source code in the block diagram to perform a user interface function, e.g., to display data in one or more user interface indicators in the graphical user interface and/or receive data from one or more user interface controls in the graphical user interface. The user may configure the graphical program to perform the user interface function in the loop. As one example, for a test and measurement application, the graphical program may perform a loop in which data is acquired from a unit under test, and the data may be displayed in a graph indicator for each pass through the loop.

In 303, the graphical program created by the user may be stored in a memory. For example, the graphical program may be stored in a memory of a computer system which executes a program to programmatically analyze/modify the graphical program to improve its performance, as described below. Storing the graphical program in the memory may include storing one or more data structures representing the graphical program in the memory and/or storing program instructions for the graphical program in the memory.

In 305, the user's graphical program may be programmatically analyzed. Programmatically analyzing the graphical program may include any technique or method implemented by a program that inspects or examines the graphical program. For example, programmatically analyzing the graphical program may include analyzing the one or more data structures representing the graphical program in the memory, e.g., to determine graphical program elements present in the graphical program. In 305, the loop performed by the graphical program may be analyzed. This may include determining graphical source code or functionality performed by the loop.

In 307, the user's graphical program may be programmatically modified based on the analysis performed in 305.

The graphical program may be programmatically modified with little or no input received during the modification process. In one embodiment, the method may include displaying a series of user interface panels or screens to guide the user through the process of modifying the graphical program or to allow the user to specify options affecting the modifications made to the graphical program.

As discussed above, the graphical program may be programmatically modified to improve performance of the loop performed by the graphical program. In various embodiments, the performance of the loop may be improved in any of various ways. In one embodiment, performance may be increased by removing functionality from the loop, e.g., by removing graphical source code which performs the functionality. As discussed above, another graphical program may be programmatically generated to execute in parallel with the user's graphical program to perform the functionality previously performed by the user's graphical program.

As discussed above, in one embodiment, it may be desirable to improve performance of a real-time or time-critical graphical program. Many time-critical programs include a loop, referred to herein as a time-critical loop. For time-critical graphical programs, it may be very important that the time-critical loop is executed in a deterministic manner. Thus, increasing the performance of a time-critical graphical program may involve increasing the determinism of the time-critical loop.

Figure 5:
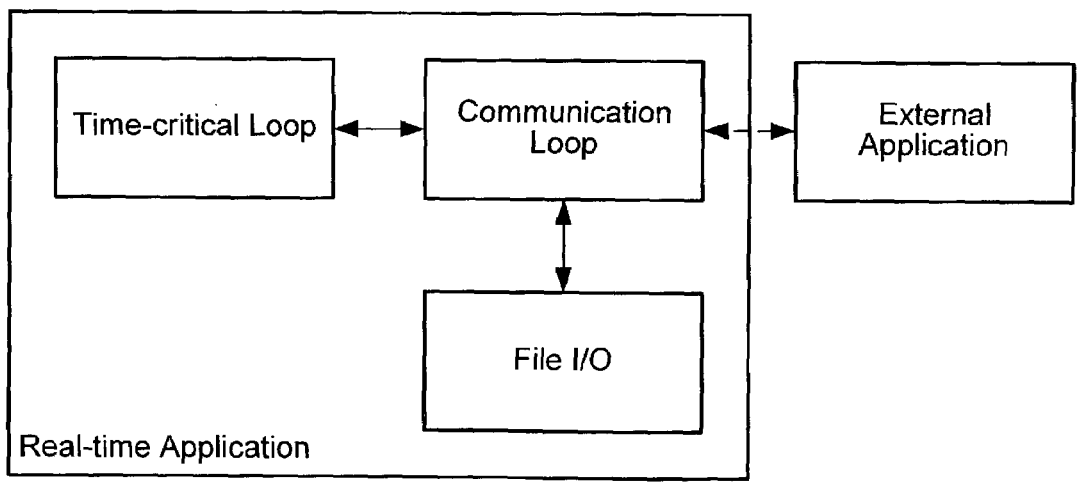
FIGS. 5 and 6 illustrate a general approach which allows for a graphical user interface for a time-critical graphical program, but without associated latency problems.
Figure 6:
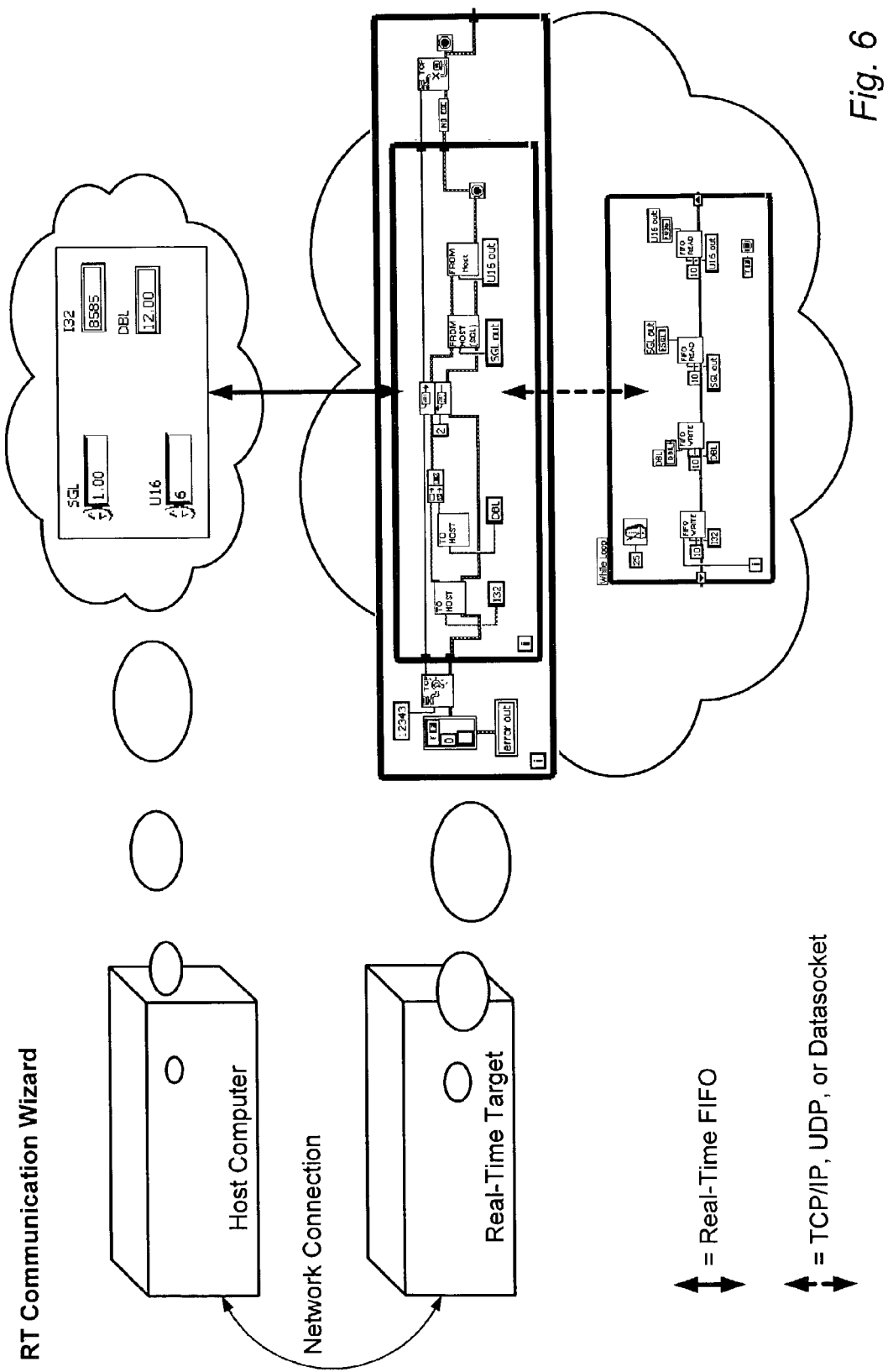

As discussed above with reference to FIG. 1B, graphical source code which performs a user interface function may introduce time latency problems or jitter into a time-critical loop, thereby reducing determinism of the loop. FIGS. 5 and 6 illustrate a general approach which allows for a graphical user interface for a time-critical graphical program, but without these associated latency problems.

As shown in FIG. 5, in addition to the time-critical loop executed by the graphical program, another loop may be introduced, referred to as the communication loop. The communication loop may be executed by a second program, which according to one embodiment of the method may be a programmatically, i.e., automatically, generated graphical program. This second graphical program is referred to herein as the data exchange graphical program. (The graphical program created by the user and subsequently modified, i.e., the graphical program containing the time-critical loop, is referred to as the time-critical graphical program.) Whereas the time-critical graphical program may be executed at the highest priority for the operating system, the data exchange program may be executed at normal priority.

FIG. 5 also illustrates that the data exchange graphical program may communicate with an external application, which according to one embodiment of the method may be another programmatically generated graphical program, referred to herein as the UI graphical program. The UI graphical program may be responsible for the user interface functionality previously performed by the time-critical graphical program. For example, the UI graphical program may display output of the time-critical graphical program in one or more user interface indicators. The UI graphical program may also receive input for the time-critical graphical program via one or more user interface controls.

The data exchange graphical program may act as an intermediate program between the time-critical graphical program and the UI graphical program. For example, the data exchange graphical program may receive data generated by the time-critical graphical program and may send the data to the UI program. The UI graphical program may then display the data in a user interface indicator. Similarly, the UI graphical program may receive data via a user interface control and may send the data to the data exchange graphical program. The time-critical graphical program may then receive this data from the data exchange graphical program.

FIG. 6 illustrates the interaction among the various graphical programs. (A block diagram for the UI graphical program is not shown. Only the graphical user interface displayed by the UI graphical program is illustrated.) As shown in FIG. 6, in one embodiment, the time-critical graphical program and the data exchange graphical program may execute on a first computer system (e.g., the real-time target device 81), and the UI graphical program may execute on a second computer system, which may be a remote computer system connected via a network.

Thus, in one embodiment, programmatically modifying the time-critical graphical program may include modifying the time-critical graphical program to exchange data with the data exchange graphical program. For example, where the unmodified time-critical graphical program previously generated data and displayed the data in a user interface indicator, the programmatically modified time-critical graphical program may instead pass the data to the data exchange graphical program. Similarly, where the unmodified time-critical graphical program previously received data from a user interface control, the programmatically modified time-critical graphical program may instead receive the data from the data exchange graphical program.

The data exchange graphical program may be programmatically generated such that the program is operable to act as an intermediary between the time-critical graphical program and the UI graphical program, as described above. This may involve programmatically including a communication loop in the data exchange graphical program, where the communication loop executes in parallel with the time-critical loop of the time-critical graphical program. In the preferred embodiment, the time-critical graphical program is programmatically modified to allow the time-critical loop to exchange data with the communication loop of the data exchange graphical program in such a way that the data exchange occurs without reducing determinism of the time-critical loop. One exemplary data structure that allows this type of data exchange optimized for a real-time application is described below.

The UI graphical program may be programmatically generated such that the program is operable to receive data from the data exchange graphical program for display on the graphical user interface and/or send data for use by the time-critical graphical program from the graphical user interface to the data exchange graphical program, as described above. In one embodiment, the method may prompt the user to select a desired communication technique (e.g., TCP/IP. UDP, DataSocket, etc.) to use for the communication between the data exchange graphical program and the UI graphical program. Thus, both of these programs may be programmatically generated in such a way that they use the communication technique selected by the user. For example, if the user specifies that the TCP/IP communication technique is to be used, then nodes operable to perform network communication using the TCP/IP protocol may be included in the two programmatically generated graphical programs.

Although the method is described above in terms of programmatically modifying a graphical program that includes a loop, it is noted that in other embodiments, the graphical program may not necessarily include a loop. For example, the graphical program may include one or more repetitive operations that are repeatedly performed in response to an event, trigger, or other condition. For example, the event, trigger, or other condition may occur multiple times during execution of the graphical program, and the one or more operations may be performed in response to each occurrence. As one example, a user interface function may be repeatedly performed in response to an event or trigger which occurs multiple times during execution of the graphical program. Thus, the method may improve performance of the graphical program similarly as described above by programmatically modifying, removing, or replacing the one or more repetitive operations.

Figure 7:
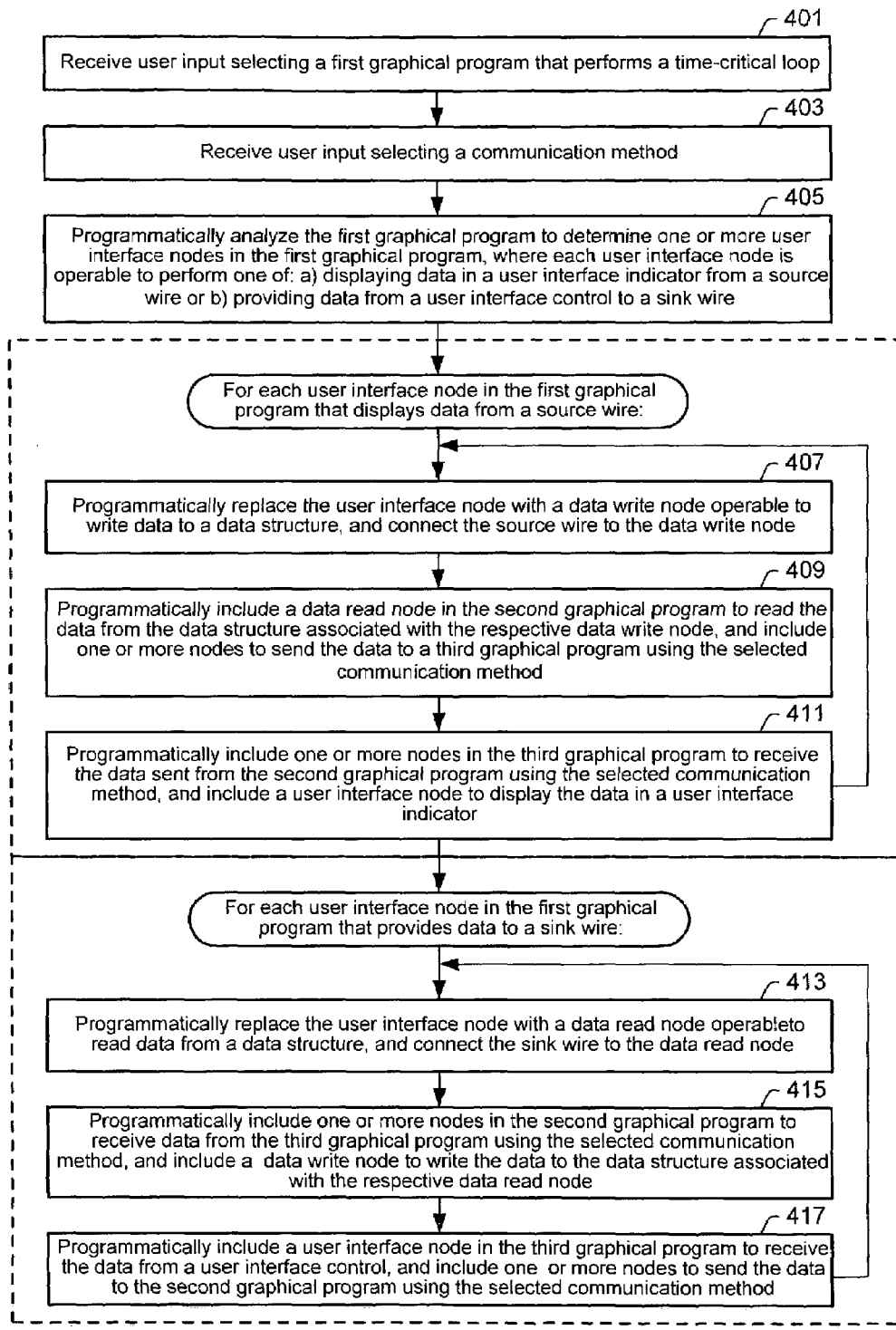
FIG. 7 is a detailed flowchart diagram illustrating one embodiment of a method for programmatically modifying a graphical program to remove user interface functionality from the graphical program.

FIG. 7—Detailed Method

FIG. 7 is a detailed flowchart diagram illustrating one embodiment of a method for programmatically modifying a graphical program to remove user interface functionality from the graphical program as described above. It is noted that FIG. 7 is intended to be exemplary only, and alternative embodiments are contemplated.

Figure 8:
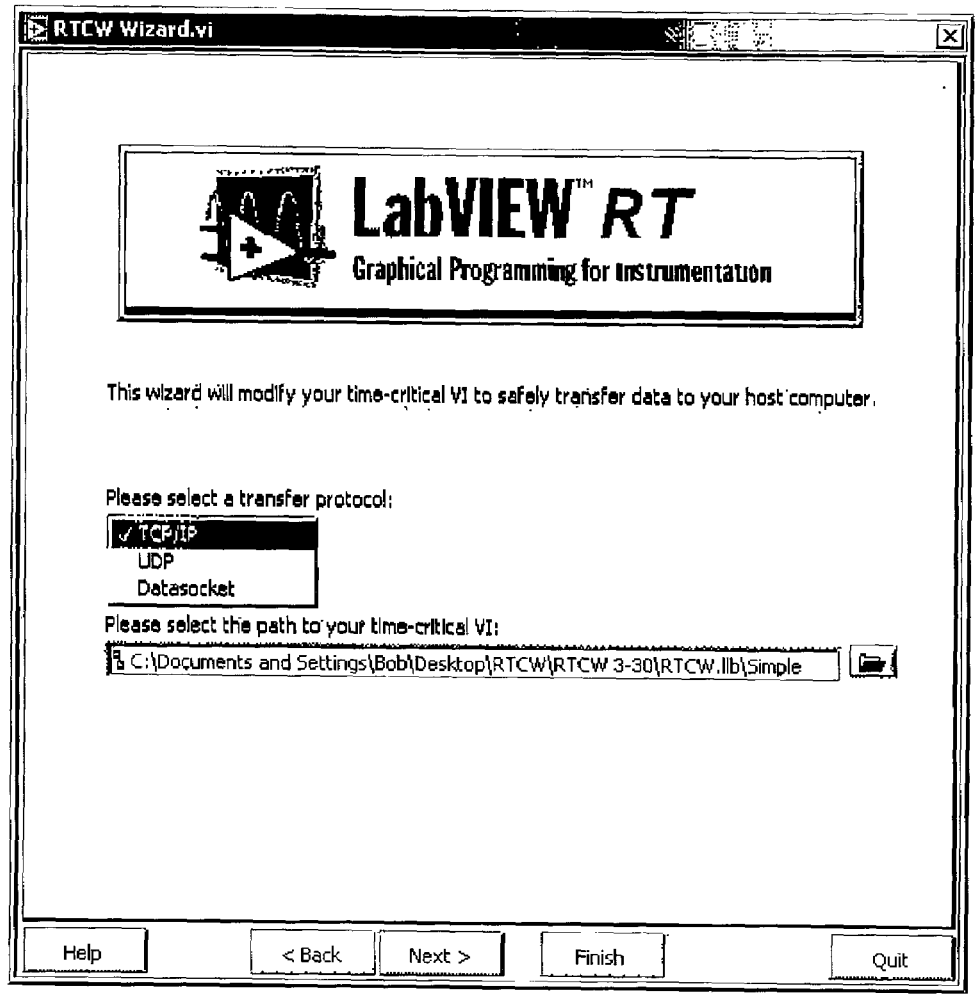
FIG. 8 illustrates an exemplary screen to allow the user to specify a graphical program to be programmatically analyzed and modified.

In 401, user input selecting a first graphical program that performs a time-critical loop may be received. For example, FIG. 8 illustrates an exemplary screen to allow the user to specify a pathname where the graphical program can be found. The first graphical program may be a time-critical graphical program which the user desires to be automatically modified.

In 403, user input selecting a desired communication method may be received. As described above, the communication method may be used in generating graphical programs to accompany the modified graphical program. The screen shown in FIG. 8 also allows the user to specify the desired communication method.

In 405, the time-critical graphical program may be programmatically analyzed to determine graphical source code in the program involved with user interface functionality. In one embodiment, this may involve programmatically determining one or more user interface nodes present in the time-critical graphical program. Each user interface node may be operable to perform one of: a) displaying data in a user interface indicator from a source wire or b) providing data from a user interface control to a sink wire. For example, LabVIEW graphical programs can include user interface nodes (referred to as user interface terminals) to/from which wires can be connected from/to other nodes in the graphical program. For example, a wire may be connected from an output terminal of another node in the graphical program to a user interface node representing a user interface indicator on the graphical user interface. This wire may thus be referred to as a source wire, since it is a source of data displayed on the user interface. Similarly, a wire may be connected from a user interface node representing a user interface control on the graphical user interface to an input terminal of another node in the graphical program. This wire may thus be referred to as a sink wire, since it is a sink for data received from the user interface.

For each user interface node in the time-critical graphical program that displays data from a source wire, 407, 409, and 411 may be performed.

In 407, the user interface node may be programmatically replaced with a data write node. The source wire that was previously connected to the user interface node may be programmatically connected to the data write node. The data write node may be operable to write data from the source wire to a data structure. As described below, the data exchange program may then read the data from this data structure.

In 409, a data read node may be programmatically included in the second graphical program (i.e., the data exchange graphical program) to read the data from the data structure associated with the respective data write node in the time-critical graphical program. Thus, data may be passed from the time-critical graphical program to the data exchange graphical program via the data structure. Also in 409, one or more nodes for sending the data to the third graphical program (i.e., the UI graphical program) using the selected communication method may be programmatically included in the data exchange graphical program.

In 411, one or more nodes may be programmatically included in the UI graphical program for receiving the data sent from the data exchange graphical program using the selected communication method. Also, a user interface node for displaying the data in a user interface indicator may be programmatically included in the UI graphical program. The user interface indicator for displaying the data may also be programmatically added to the graphical user interface or front panel for the UI graphical program. This user interface indicator may be an indicator of the same type that originally displayed the data in the time-critical graphical program.

Thus, according to one embodiment, for each user interface indicator that originally displayed data in the time-critical graphical program, a pair of data write/data read nodes may pass the data from the time-critical graphical program to the data exchange graphical program, and the data may then be sent to the UI graphical program. It is noted that it may not be necessary in 409 to include separate nodes for sending data read by each of the data read nodes to the UI graphical program. For example, one set of nodes may be included in the data exchange graphical program, where these nodes are responsible for receiving data from each of the data read nodes and marshaling the data into a buffer to be sent to the UI graphical program. Similarly, one set of nodes in the UI graphical program may receive data sent from the data exchange graphical program.

For each user interface node in the time-critical graphical program that provides data to a sink wire, 413, 415, and 417 may be performed.

In 413, the user interface node may be programmatically replaced with a data read node. The sink wire that was previously connected to the user interface node may be programmatically connected to the data read node. The data read node may be operable to provide data from a data structure to the sink wire. As described below, the data exchange program may write the data into this data structure.

In 415, one or more nodes to receive the data to be read by the data read node in the time-critical graphical program may be programmatically included in the data exchange graphical program. These one or more nodes may receive the data from the UI graphical program using the selected communication method. A data write node to write the data to the data structure associated with the respective data read node in the time-critical graphical program may also be programmatically included in the data exchange graphical program. Thus, the data may be passed from the data exchange graphical program to the time-critical graphical program via the data structure.

In 417, a user interface node to receive the data from a user interface control may be programmatically included in the UI graphical program. The user interface control for allowing the user to input the data may also be programmatically added to the graphical user interface or front panel for the UI graphical program. This user interface control may be a control of the same type that originally received the data in the time-critical graphical program. Also in 417, one or more nodes for sending the data received from the user interface control to the data exchange graphical program using the selected communication method may be programmatically included in the UI graphical program.

Thus, according to one embodiment, for each user interface control that originally received data in the time-critical graphical program, a pair of data write/read nodes may pass the data from the data exchange graphical program to the time-critical graphical program, where the data is sent from the UI graphical program to the data exchange graphical program. It is noted that it may not be necessary in 417 to include separate nodes for sending data received from each user interface control to the data exchange program. For example, one set of nodes may be included in the UI graphical program, where these nodes are responsible for receiving data from each of the user interface controls and marshaling the data into a buffer to be sent to the data exchange graphical program. Similarly, one set of nodes in the data exchange graphical program may receive data sent from the UI graphical program.

In one embodiment, the method may also provide instructions on how to launch the set of resulting graphical programs. In one embodiment, the method may also operate to automatically deploy one or more of the graphical programs on one or more computer systems. For example, the time-critical graphical program and/or the data exchange graphical program may be automatically downloaded or deployed on a real-time target device. Also, the UI graphical program may be automatically deployed on a remote computer system.

Also, as indicated in FIG. 5, in one embodiment, instead of or in addition to displaying data on and receiving data from the graphical user interface, data may be logged to or read from one or more files. For example, instead of or in addition to choosing a network communication technique for the data communication, the user may choose a File I/O technique. In this instance, the data exchange graphical program may be generated with nodes operable to log data received from the time-critical graphical program to a file and/or read data to be passed to the time-critical graphical program from a file. In another embodiment, the data may be sent to the UI graphical program, and the UI graphical program may write the data to a file.

FIG. 7—RT FIFO nodes

For a time-critical graphical program, it may be desirable for the data read and data write nodes which exchange data between the data exchange and time-critical graphical programs to have certain properties which facilitate the communication. In particular, it would be desirable to enable the time-critical graphical program to write data using a data write node and read data using a data read node without blocking. This may allow the data to be communicated to/from the data exchange graphical program without introducing latency problems in either the read or write operation.

Figure 9:
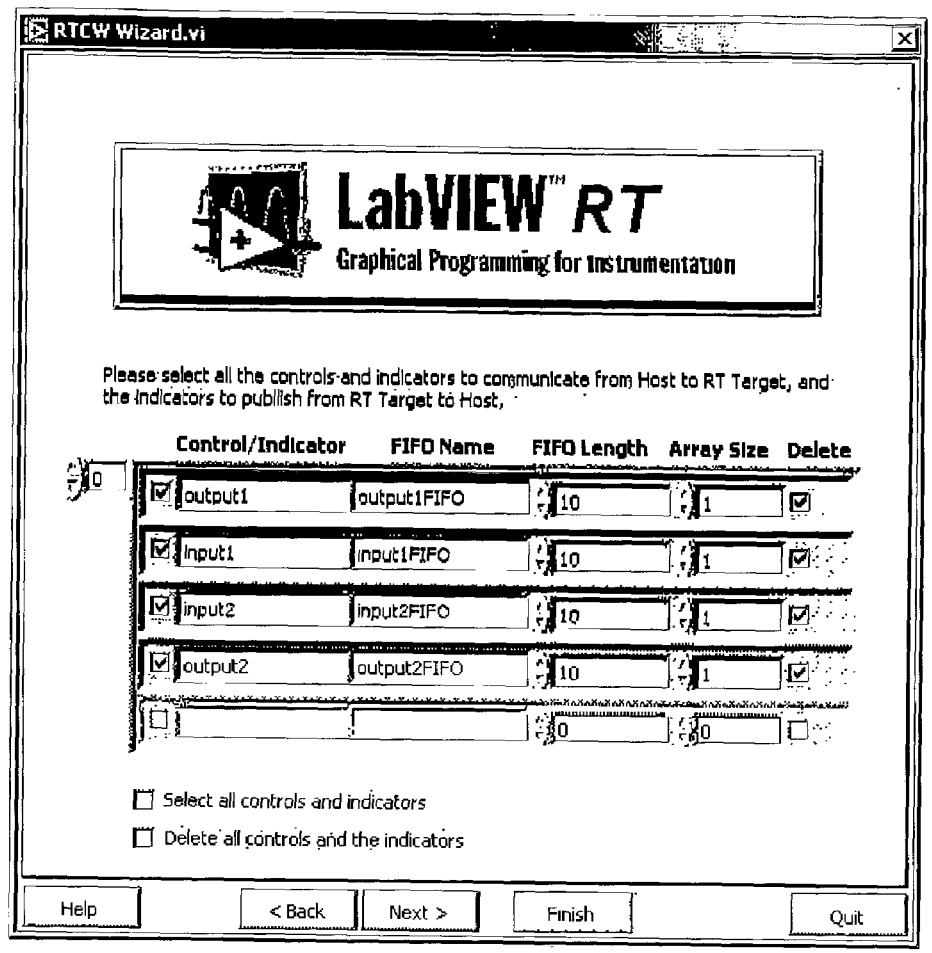
FIG. 9 illustrates an exemplary screen to allow the user to specify sizes of queues used in modifying a graphical program.

In one embodiment, a set of nodes referred to as RT FIFO nodes which satisfy these criteria may be utilized. Each RT FIFO node may be associated with a FIFO (first in-first out) queue. The nodes may allow data to be read from and written to the queue at the same time. In one embodiment, the user may be allowed to specify a size desired for each queue, as shown in FIG. 9.

The use of a pair of RT FIFO nodes involves creating the RT FIFO in one graphical program and either passing the RT FIFO reference to the other graphical program, or opening a reference to the RT FIFO in the other graphical program. Writes to the RT FIFO may then be performed in one graphical program, and reads from the RT FIFO may be performed in the other graphical program.

The data may be placed into and retrieved from the RT FIFO queues in a non-blocking manner so that determinism of the time-critical loop is not reduced and no latency problems result from the data exchange. For example, let r1 represent the loop rate of the time-critical loop without exchanging data through the RT FIFO queues, and let r2 represent the loop rate of the time-critical loop including data exchange through the RT FIFO queues. The measurable variation in loop performance with respect to time (or jitter) is not affected by the data exchange through the RT FIFO queues. In other words, $\Delta r1/\Delta t=\Delta r2/\Delta t$. The rate r2 may be less than the rate r1, due simply to the increased computation performed by the loop with the addition of the data exchange code. Using a data structure without the real-time optimized characterictics of the RT FIFO queue, however, would not only reduce the loop rate (i.e., r2<r1) but would also introduce more jitter (i.e., $\Delta r1/\Delta t<\Delta r2/\Delta t$).

FIGS. 10–13: Exemplary Graphical Programs

Figure 10:
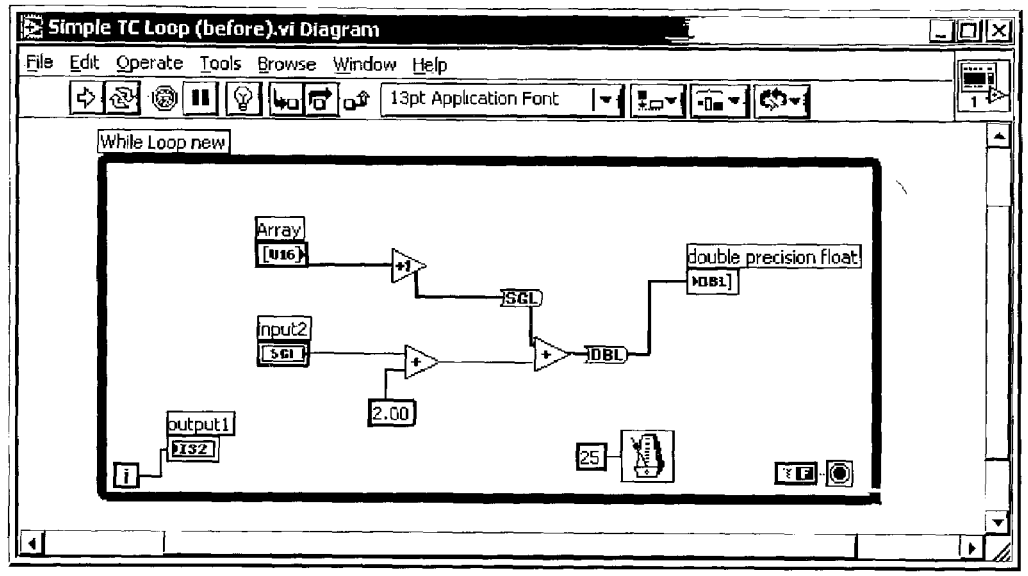
FIG. 10 illustrates an exemplary graphical program to be programmatically analyzed and modified.

FIG. 10 illustrates an exemplary time-critical graphical program created by a user. This example illustrates a simple graphical program for illustrative purposes only. As shown, the graphical program includes a while loop. The graphical source code inside the loop is performed for each loop iteration. In each iteration, first input data is received from a user interface control represented by the user interface node labeled, "Array". Also, second input data is received from a user interface control represented by the user interface node labeled, "input2". After some simple mathematical calculations performed on the input data, output data is provided to the user interface node labeled, "double precision float", which represents a user interface indicator that displays the output data. Also, the current loop iteration number is provided to the user interface node labeled, "output1", which represents a user interface indicator that displays the current iteration number.

Figure 11:
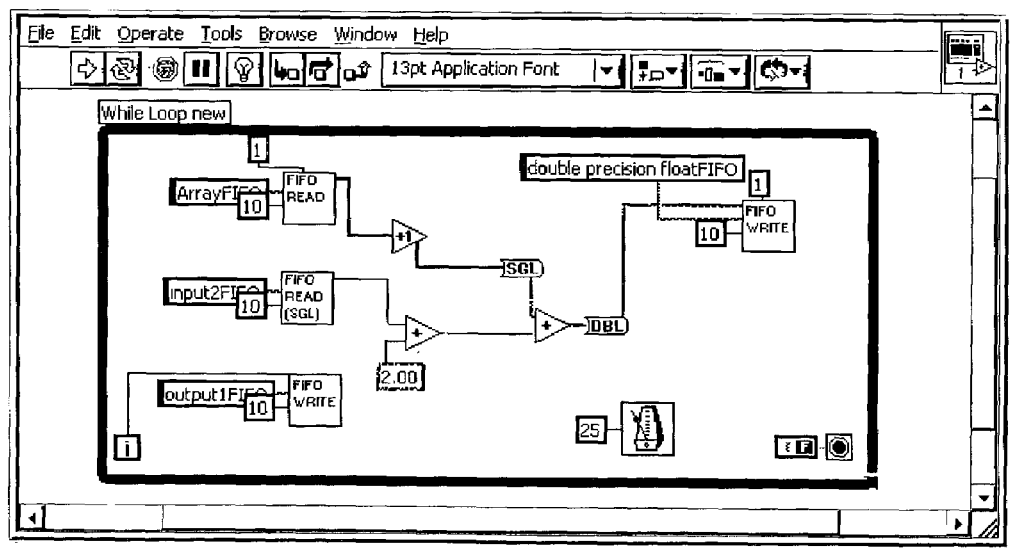
FIG. 11 illustrates the graphical program of FIG. 10 after being programmatically modified.

FIG. 11 illustrates the time-critical graphical program after being automatically modified as described above. As shown, the time-critical graphical program no longer performs a user interface function. The user interface nodes have been programmatically replaced with data read and data write nodes (RT FIFO nodes) as described above.

Figure 12:
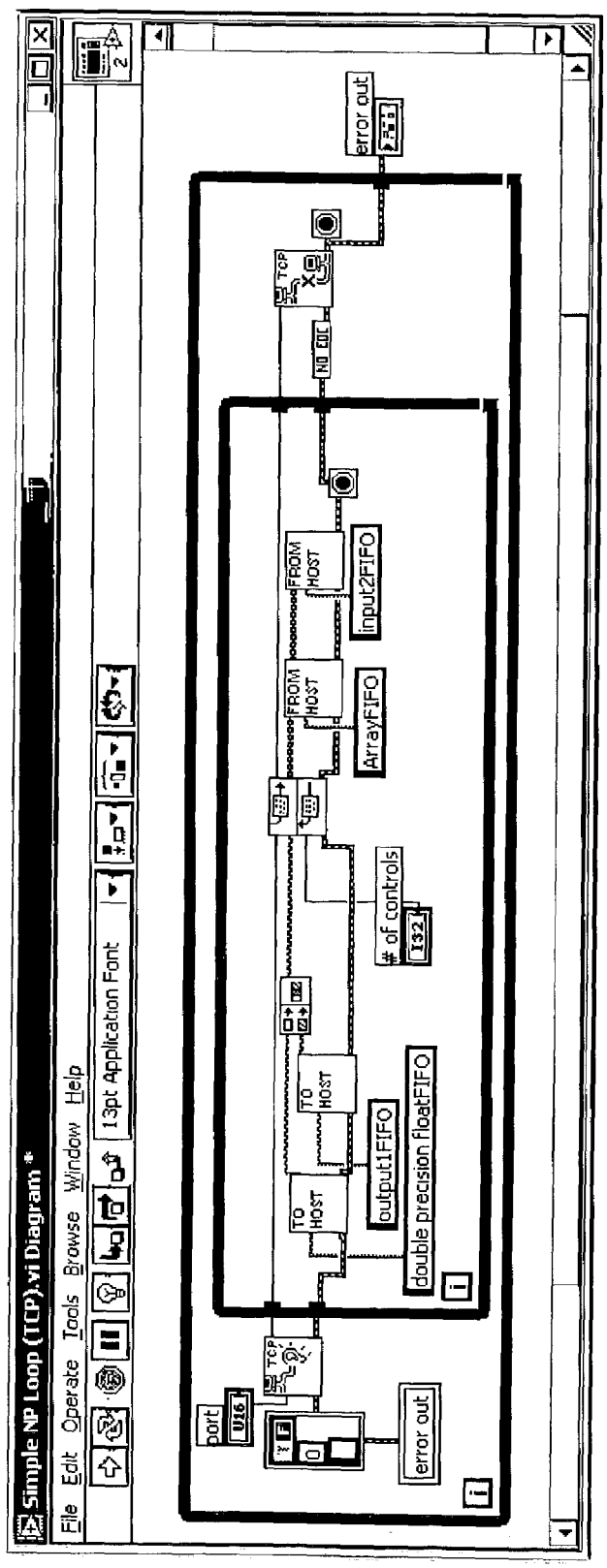
FIGS. 12 and 13 illustrate programmatically generated graphical programs to accompany the programmatically modified graphical program of FIG. 11.

FIG. 12 illustrates the programmatically generated data exchange program that accompanies the modified time-critical graphical program. The data exchange graphical program includes a communication loop as described above. Within the communication loop, two data read nodes corresponding to the two data write nodes in the time-critical graphical program have been included. Also, two data write nodes corresponding to the two data read nodes in the time-critical graphical program have been included. The TCP node on the left side of the graphical program is operable to receive data sent from the UI graphical program. The TCP node on the right side of the graphical program is operable to send data to the UI graphical program.

Figure 13:
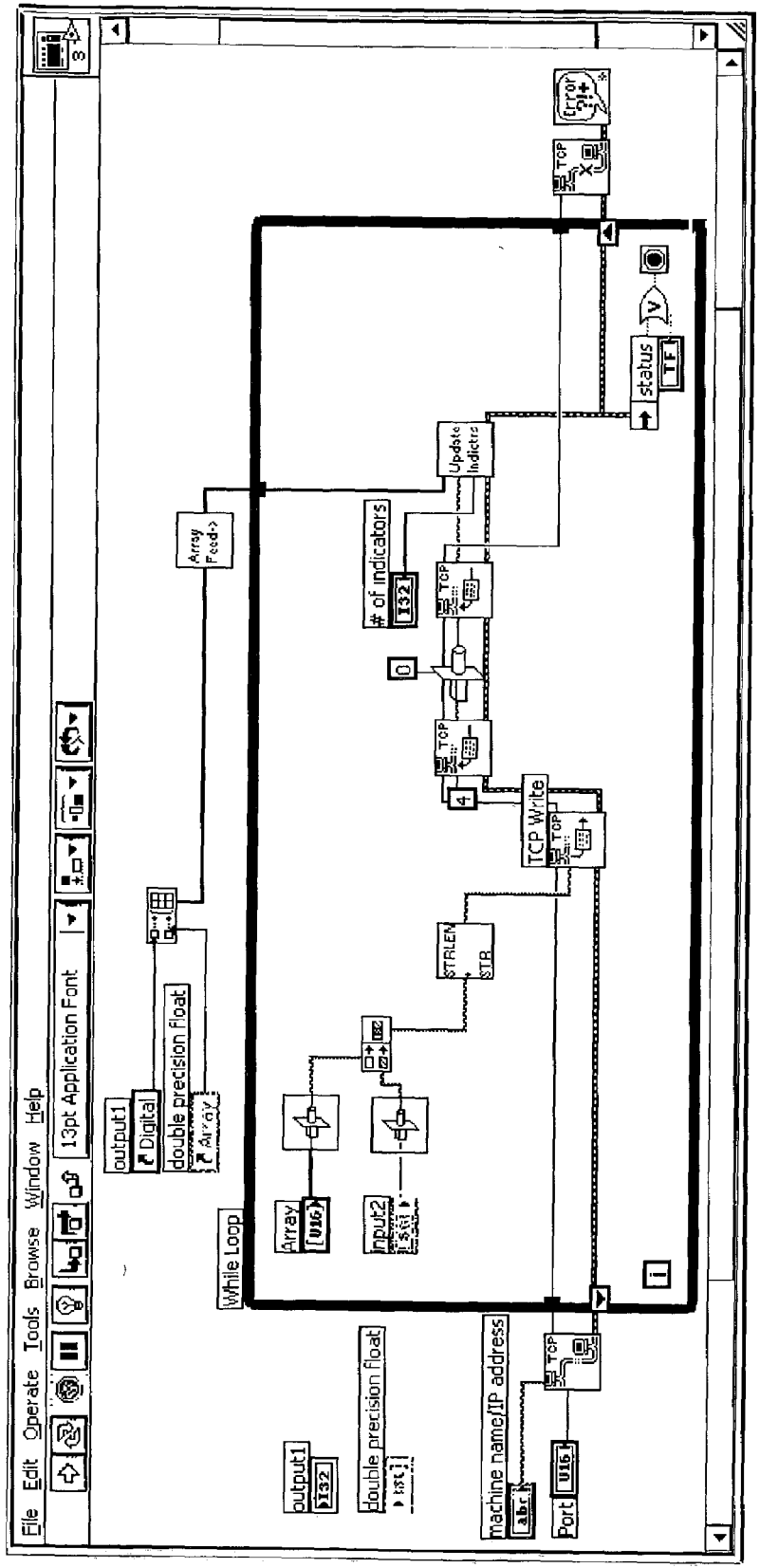

FIG. 13 illustrates the programmatically generated UI program that accompanies the data exchange graphical program. The UI graphical program includes two user interface nodes representing the two user interface indicators used in the original time-critical graphical program. These user interface nodes are labeled identically, i.e., "double precision float" and "output1". Similarly, the UI graphical program includes two user interface nodes representing the two user interface controls used in the original time-critical graphical program. These user interface nodes are labeled identically, i.e., "Array" and "input2". The user interface nodes representing user interface controls have been placed inside of a loop where they can be read continuously. On the other hand, the user interface nodes representing user interface indicators may not need to be inside the loop, as shown.

The UI graphical program also includes TCP nodes for sending data to and receiving data from the data exchange graphical program. It is noted that if the user had selected a communication method other than TCP, then the data exchange and UI graphical programs would have been generated so as to include nodes other than the TCP nodes shown, i.e., nodes operable to send/receive data using the selected communication method.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for programmatically changing a first graphical program that performs a repetitive operation, the method comprising:
   storing the first graphical program in a memory;
   automatically analyzing the first graphical program, wherein said automatically analyzing the first graphical program includes automatically analyzing the repetitive operation performed by the first graphical program; and
   automatically modifying the first graphical program based on said automatically analyzing the first graphical program, wherein said automatically modifying the first graphical program includes automatically modifying the repetitive operation performed by the first graphical program, and wherein said automatically modifying the first graphical program is performed without direct user input specifying the modifying;
   wherein said automatically modifying the repetitive operation performed by the first graphical program improves performance of the first graphical program.

2. The method of claim 1,
   wherein the graphical program includes first graphical source code that implements the repetitive operation;
   wherein said automatically analyzing the repetitive operation comprises automatically analyzing the first graphical source code; and
   wherein said automatically modifying the repetitive operation comprises automatically modifying the first graphical source code.

3. The method of claim 1,
   wherein the graphical program comprises a plurality of interconnected nodes that visually indicate functionality of the graphical program.

4. The method of claim 1,
   wherein the graphical program comprises a graphical data flow program.

5. The method of claim 1,
   wherein said automatically modifying the first graphical program comprises automatically modifying the graphical program with no user input received during said modifying.

6. The method of claim 1,
   wherein said automatically modifying the repetitive operation performed by the first graphical program increases determinism of the first graphical program.

7. The method of claim 1,
   wherein said automatically modifying the repetitive operation performed by the first graphical program comprises automatically replacing the repetitive operation with a different operation.

8. The method of claim 1,
   wherein, before said automatically modifying the repetitive operation performed by the first graphical program, the repetitive operation causes latency problems during execution of the first graphical program; and
   wherein said automatically modifying the repetitive operation performed by the first graphical program reduces the latency problems.

9. The method of claim 1,
   wherein the first graphical program includes a loop;
   wherein the repetitive operation comprises an operation performed in the loop.

10. The method of claim 1,
    wherein the repetitive operation comprises an operation performed in response to one of:
    an event;
    a trigger.

11. A computer-implemented method for automatically changing a first graphical program that performs a loop, the method comprising:
    storing the first graphical program in a memory;
    automatically analyzing the first graphical program, wherein said automatically analyzing the first graphical program includes automatically analyzing the loop performed by the first graphical program; and
    automatically modifying the first graphical program based on said automatically analyzing the first graphical program, wherein said automatically modifying the first graphical program includes automatically modifying the loop performed by the first graphical program, and wherein said automatically modifying the first graphical program is performed without direct user input specifying the modifying;
    wherein said automatically modifying the loop performed by the first graphical program improves performance of the loop.

12. The method of claim 11,
    wherein the graphical program includes first graphical source code that implements the loop;
    wherein said automatically analyzing the loop comprises automatically analyzing the first graphical source code; and
    wherein said automatically modifying the loop comprises automatically modifying the first graphical source code.

13. The method of claim 11,
    wherein the graphical program comprises a plurality of interconnected nodes that visually indicate functionality of the graphical program.

14. The method of claim 11,
    wherein the graphical program comprises a graphical data flow program.

15. The method of claim 11,
    wherein said automatically modifying the first graphical program comprises automatically modifying the graphical program with no user input received during said modifying.

16. The method of claim 11,
wherein said automatically modifying the loop performed by the first graphical program increases determinism of the loop.

17. The method of claim 11,
wherein, before said automatically modifying the loop performed by the first graphical program, the loop performs a first function that reduces determinism of the loop; and
wherein said automatically modifying the loop performed by the first graphical program comprises removing the first function from the loop.

18. The method of claim 11,
wherein, before said automatically modifying the loop performed by the first graphical program, the loop performs a first function that reduces determinism of the loop; and
wherein said automatically modifying the loop performed by the first graphical program comprises replacing the first function with a second function, wherein said replacing the first function with the second function increases determinism of the loop.

19. The method of claim 11,
wherein, before said automatically modifying the loop performed by the first graphical program, the loop suffers from latency problems during execution of the first graphical program; and
wherein said automatically modifying the loop performed by the first graphical program reduces the latency problems.

20. The method of claim 11,
wherein the loop comprises a time-critical loop executed by a thread having a highest priority.

21. The method of claim 11,
wherein the loop comprises a time-critical loop that performs a real-time function.

22. The method of claim 21,
wherein the real-time function includes one or more of acquiring data from a hardware device and/or sending data to a hardware device.

23. The method of claim 11,
wherein, before said automatically modifying the loop performed by the first graphical program, the loop performs a user interface function that introduces latency problems into the loop; and
wherein said automatically modifying the loop performed by the first graphical program comprises removing the user interface function from the loop.

24. The method of claim 11,
wherein, before said automatically modifying the loop performed by the first graphical program, the loop includes first graphical source code that performs a user interface function that reduces determinism of the loop;
wherein said automatically analyzing the loop performed by the first graphical program comprises determining the presence of the first graphical source code that performs the user interface function; and
wherein said automatically modifying the loop performed by the first graphical program comprises removing the first graphical source code that performs the user interface function from the loop.

25. The method of claim 24,
wherein the user interface function performed by the first graphical source code comprises displaying data acquired in the loop in a user interface indicator;
wherein the method further comprises replacing the first graphical source code that performs the user interface function with second graphical source code that exchanges the data acquired in the loop with a second graphical program;
wherein the second graphical program performs a user interface function to display the data in a user interface indicator;
wherein said replacing the first graphical source code with the second graphical source code increases determinism of the loop.

26. The method of claim 25,
wherein said exchanging the data with the second graphical program comprises exchanging the data via a first in-first out (FIFO) queue data structure.

27. The method of claim 26,
wherein the second graphical source code is executed by a first thread;
wherein the FIFO queue data structure allows the first thread to place the data in the FIFO queue data structure without the first thread blocking.

28. The method of claim 26,
wherein the FIFO queue data structure allows the second graphical source code to place the data in the FIFO queue data structure without introducing latency problems into the loop.

29. The method of claim 25, further comprising:
automatically generating the second graphical program;
wherein said automatically generating the second graphical program comprises automatically including graphical source code in the second graphical program to exchange the data with the first graphical program and to display the data in a user interface indicator.

30. The method of claim 25,
wherein the first graphical program is executed at a highest priority;
wherein the second graphical program is executed at a normal priority.

31. The method of claim 30,
wherein both the first graphical program and the second graphical program are executed on a first computer system.

32. The method of claim 24,
wherein the user interface function performed by the first graphical source code comprises providing data acquired from a user interface control to the loop;
wherein the method further comprises replacing the first graphical source code that performs the user interface function with second graphical source code that receives data from a second graphical program;
wherein the second graphical program performs a user interface function to acquire the data from a user interface control;
wherein said replacing the first graphical source code with the second graphical source code increases determinism of the loop.

33. The method of claim 32,
wherein said receiving the data from the second graphical program comprises receiving the data via a first in-first out (FIFO) queue data structure.

34. The method of claim 33,
wherein the FIFO queue data structure allows the second graphical source code to retrieve the data from the FIFO queue data structure without introducing latency problems into the loop.

35. The method of claim 32, further comprising:
automatically generating the second graphical program;
wherein said automatically generating the second graphical program comprises automatically including graphical source code in the second graphical program to acquire the data from a user interface control and to exchange the data with the first graphical program.

36. The method of claim 32,
wherein the first graphical program is executed at a highest priority;
wherein the second graphical program is executed at a normal priority.

37. The method of claim 11,
wherein, before said automatically modifying the loop performed by the first graphical program, the loop includes first graphical source code that performs an input/output function that reduces determinism of the loop;
wherein said automatically analyzing the loop performed by the first graphical program comprises determining the presence of the first graphical source code that performs the input/output function; and
wherein said automatically modifying the loop performed by the first graphical program comprises removing the first graphical source code that performs the input/output function from the loop.

38. The method of claim 11,
wherein, before said automatically modifying the loop performed by the first graphical program, the loop is operable to perform an output function to store data acquired in the loop, wherein the output function reduces determinism of the loop;
wherein said automatically modifying the loop performed by the first graphical program comprises automatically modifying the loop to exchange the data acquired in the loop with a second graphical program;
wherein the second graphical program performs an output function to store the data acquired in the loop;
wherein said automatically modifying the loop increases determinism of the loop.

39. The method of claim 38,
wherein, before said automatically modifying the loop performed by the first graphical program, the loop is operable to perform an output function to store the data acquired in the loop in a file;
wherein the second graphical program performs an output function to store the data acquired in the loop in a file.

40. The method of claim 11,
wherein, before said automatically modifying the loop performed by the first graphical program, the loop includes first graphical source code to display data acquired in the loop in a user interface indicator, wherein said displaying the data acquired in the loop in a user interface indicator reduces determinism of the loop;
wherein said automatically modifying the loop performed by the first graphical program comprises replacing the first graphical source code that displays the data with second graphical source code that exchanges the data with a second graphical program;
wherein the second graphical program exchanges the data with a third graphical program;
wherein the third graphical program performs a user interface function to display the data in a user interface indicator;
wherein said replacing the first graphical source code with the second graphical source code increases determinism of the loop.

41. The method of claim 40,
wherein both the first graphical program and the second graphical program are executed on a first computer system;
wherein the third graphical program is executed on a second computer system, wherein the second computer system is coupled to the first computer system via a network;
wherein said second graphical program exchanging the data with the third graphical program comprises the second graphical program sending the data to the third graphical program via the network.

42. The method of claim 41, further comprising:
automatically generating the second graphical program;
wherein said automatically generating the second graphical program comprises automatically including graphical source code in the second graphical program to exchange the data with the first graphical program and to send the data to the third graphical program via the network.

43. The method of claim 41, further comprising:
automatically generating the third graphical program;
wherein said automatically generating the third graphical program comprises automatically including graphical source code in the third graphical program to receive the data from the second graphical program via the network and to display the data in a user interface indicator.

44. The method of claim 11,
wherein, before said automatically modifying the loop performed by the first graphical program, the loop includes first graphical source code to provide data acquired from a user interface control to the loop, wherein said providing data acquired from a user interface control to the loop reduces determinism of the loop;
wherein said automatically modifying the loop performed by the first graphical program comprises replacing the first graphical source code with second graphical source code that receives the data from a second graphical program;
wherein the second graphical program receives the data from a third graphical program;
wherein the third graphical program performs a user interface function to receive the data from a user interface control;
wherein said replacing the first graphical source code with the second graphical source code increases determinism of the loop.

45. The method of claim 44,
wherein both the first graphical program and the second graphical program are executed on a first computer system;
wherein the third graphical program is executed on a second computer system,
wherein the second computer system is coupled to the first computer system via a network;
wherein said second graphical program receiving the data from the third graphical program comprises the third graphical program sending the data to the second graphical program via the network.

46. The method of claim 44, further comprising:
automatically generating the second graphical program;
wherein said automatically generating the second graphical program comprises automatically including graphical source code in the second graphical program to provide the data to the first graphical program and to receive the data from the third graphical program via the network.

47. The method of claim 44, further comprising:

automatically generating the third graphical program;

wherein said automatically generating the third graphical program comprises automatically including graphical source code in the third graphical program to receive the data from a user interface indicator and to send the data to the second graphical program via the network.

48. The method of claim 11, further comprising:

receiving user input selecting the first graphical program.

49. The method of claim 11, wherein said storing the first graphical program in the memory comprises storing one or more data structures representing the first graphical program in the memory;

wherein said automatically analyzing the first graphical program comprises automatically analyzing the one or more data structures; and wherein said automatically modifying the first graphical program comprises automatically modifying the one or more data structures.

50. The method of claim 11, further comprising:

creating the first graphical program prior to said automatically analyzing the first graphical program, wherein said creating the first graphical program comprises:

arranging a plurality of nodes on a display; and interconnecting the plurality of nodes in response to user input.

51. The method of claim 11, wherein the first graphical program is operable to execute the loop to perform one or more of:
an industrial automation function;
a process control function; and/or
a test and measurement function.

52. A computer-implemented method for increasing determinism of a first graphical program, the method comprising:

storing the first graphical program in a memory;

automatically analyzing the first graphical program, wherein said automatically analyzing the first graphical program includes automatically determining one or more operations performed by the first graphical program; and automatically modifying the first graphical program based on said automatically analyzing the first graphical program, wherein said automatically modifying the first graphical program includes automatically modifying the one or more operations performed by the first graphical program, and wherein said automatically modifying the first graphical program is performed without direct user input specifying the modifying;

wherein said automatically modifying the one or more operations performed by the first graphical program increases determinism of the first graphical program.

53. A computer-implemented method for automatically changing a first graphical program, the method comprising:

automatically analyzing the first graphical program to determine first graphical source code in the first graphical program that performs a user interface function;

automatically modifying the first graphical program to replace the first graphical source code with second graphical source code, and wherein said automatically modifying the first graphical program is performed without direct user input specifying the modifying; and automatically generating a second graphical program operable to interface with the second graphical source code in the first graphical program to perform the user interface function.

54. The method of claim 53, wherein said automatically modifying the first graphical program enables the first graphical program to operate without suffering latency problems associated with performing the user interface function.

55. The method of claim 53, wherein the user interface function comprises one or more of:

displaying data in one or more user interface indicators; and/or acquiring data from one or more user interface controls.

56. The method of claim 53, wherein said second graphical program performing the user interface function comprises the second graphical program interfacing with a third graphical program to perform the user interface function.

57. The method of claim 56, wherein the third graphical program executes on a separate computer system than the first graphical program.

58. The method of claim 56, further comprising:

automatically generating the third graphical program.

59. The method of claim 53, wherein the first graphical program is operable to acquire data;

wherein the first graphical source code is operable to display the data acquired by the first graphical program in a user interface indicator;

wherein said replacing the first graphical source code with the second graphical source code comprises replacing the first graphical source code with second graphical source code operable to provide the data acquired by the first graphical program to the second graphical program;

wherein said automatically generating the second graphical program comprises automatically including graphical source code in the second graphical program to receive the data acquired by the first graphical program and to display the data in a user interface indicator.

60. The method of claim 53, wherein the first graphical source code is operable to receive data from a user interface control;

wherein said replacing the first graphical source code with the second graphical source code comprises replacing the first graphical source code with second graphical source code operable to receive the data from the second graphical program;

wherein said automatically generating the second graphical program comprises automatically including graphical source code in the second graphical program to receive the data from a user interface control and to provide the data to the first graphical program.

61. The method of claim 53, further comprising:

executing the first graphical program and the second graphical program on real-time target device.

62. The method of claim 53, further comprising:

executing the second graphical program on a first computer system; and executing the first graphical program on a device coupled to the first computer system.

63. The method of claim 53,
wherein said automatically modifying the first graphical program and automatically generating the second graphical program are performed on a first computer system;
wherein the method further comprises deploying at least one of the first graphical program and/or the second graphical program on a device coupled to the first computer system.

64. A computer-implemented method for automatically changing a first graphical program, the method comprising:
automatically analyzing the first graphical program to determine first functionality of the first graphical program;
automatically removing the first functionality from the first graphical program; and
automatically generating a second graphical program operable to perform the first functionality;
wherein said automatically removing and said automatically generating are performed without direct user input specifying the removing and the generating.

65. The method of claim 64,
wherein the automatically generated second graphical program includes graphical source code operable to communicate with the first graphical program to perform the first functionality.

66. The method of claim 65, further comprising:
executing the first graphical program and the second graphical program simultaneously;
wherein the second graphical program executes to communicate with the first graphical program to perform the first functionality.

67. A computer-implemented method for automatically changing a first graphical program, the method comprising:
automatically analyzing the first graphical program to determine first graphical source code in the first graphical program that performs a user interface function, wherein the user interface function includes one or more of: displaying data in one or more user interface indicators and/or acquiring data from one or more user interface controls;
automatically generating a third graphical program to perform the user interface function, wherein said automatically generating the third graphical program comprises automatically including graphical source code in the third graphical program to display data in the one or more user interface indicators and/or acquire data from the one or more user interface controls;
automatically generating a second graphical program operable to perform one or more of: receiving data acquired from the one or more user interface controls from the third graphical program and passing the data to the first graphical program and/or receiving data from the first graphical program and passing the data to the third graphical program for display in the one or more user interface indicators; and
automatically modifying the first graphical program to replace the first graphical source code with second graphical source code operable to perform one or more of receiving data from the second graphical program and/or passing data to the second graphical program;
wherein said automatically modifying the first graphical program removes the user interface function from the first graphical program.

68. A computer-implemented method for automatically changing a first graphical program, the method comprising:
automatically analyzing the first graphical program to determine one or more user interface nodes in the first graphical program, where each user interface node is operable to perform one of: a) displaying data in a user interface indicator from a source wire, or b) providing data from a user interface control to a sink wire;
for each user interface node in the first graphical program that displays data from a source wire, performing the following:
automatically replacing the user interface node with a data write node;
automatically connecting the source wire to the data write node;
automatically including a data read node in the second graphical program to read data from the data write node in the first graphical program;
automatically including one or more nodes in the second graphical program to send the data to a third graphical program;
automatically including one or more nodes in the third graphical program to receive the data sent from the second graphical program; and
automatically including a user interface node in the third graphical program to display the data in a user interface indicator;
for each user interface node in the first graphical program that provides data to a sink wire, performing the following:
automatically replacing the user interface node with a data read node;
automatically connecting the sink wire to the data read node;
automatically including a data write node in the second graphical program to write data to the data read node in the first graphical program;
automatically including one or more nodes in the second graphical program to receive data from the third graphical program and provide the data to the data write node;
automatically including a user interface node in the third graphical program to receive data from a user interface control; and
automatically including one or more nodes in the third graphical program to send the data received from the user interface control to the second graphical program.

* * * * *